(12) United States Patent
Minhas et al.

(10) Patent No.: US 11,308,348 B2
(45) Date of Patent: Apr. 19, 2022

(54) METHODS AND SYSTEMS FOR PROCESSING IMAGE DATA

(71) Applicants: Sensing Feeling Limited, London (GB); Cambridge Enterprise Limited, Cambridge (GB); Queen Mary University of London, London (GB)

(72) Inventors: Jag Minhas, London (GB); Magdi Ayad, London (GB); Hatice Gunes, Cambridge (GB); Ioannis Patras, London (GB); Youngkyoon Jang, London (GB)

(73) Assignees: Sensing Feeling Limited, London (GB); Cambridge Enterprise Limited, Cambridge (GB); Queen Mary University of London, London (GB)

( * ) Notice: Subject to any disclaimer, the term of this patent is extended or adjusted under 35 U.S.C. 154(b) by 88 days.

(21) Appl. No.: 16/840,127

(22) Filed: Apr. 3, 2020

(65) Prior Publication Data
US 2020/0234079 A1     Jul. 23, 2020

Related U.S. Application Data

(63) Continuation of application No. PCT/EP2018/077327, filed on Oct. 8, 2018.

(30) Foreign Application Priority Data

Oct. 6, 2017 (GR) .............................. 20170100462
Dec. 29, 2017 (EP) .................................... 17211178

(51) Int. Cl.
*G06K 9/62*     (2006.01)
*G06K 9/00*     (2006.01)
(Continued)

(52) U.S. Cl.
CPC ....... *G06K 9/6217* (2013.01); *G06K 9/00228* (2013.01); *G06K 9/00302* (2013.01);
(Continued)

(58) Field of Classification Search
CPC ............ G06K 9/6217; G06K 9/00228; G06K 9/00302; G06K 9/00335; G06K 9/00362;
(Continued)

(56) References Cited

U.S. PATENT DOCUMENTS

2015/0071557 A1    3/2015  Movellan et al.
2019/0354868 A1*  11/2019  Wierstra ................ G06N 3/086
2021/0256962 A1*   8/2021  Liu ........................ G10L 15/02

FOREIGN PATENT DOCUMENTS

CN      105608447 A        5/2016
WO      2016160237 A1     10/2016

OTHER PUBLICATIONS

Liu et al. "SSD: Single Shot MultiBox Detector", https://arxiv.org/pdf/1512.02325.pdf.
(Continued)

*Primary Examiner* — Utpal D Shah
(74) *Attorney, Agent, or Firm* — EIP US LLP (57) ABSTRACT

A computer-implemented system for processing image data. The system comprises: a sensor operable to capture image data comprising an image of an environment of the sensor; and a processing circuit comprising: a processor; and a computer-readable storage medium comprising computer-readable instructions which, when executed, cause the processor to: receive the image data from the sensor; process the image data using a first path through a neural network to obtain first data, the first path configured to indicate a presence in the environment of one or more objects of a predetermined object type; process the image data using a second path through a neural network to obtain second data,
(Continued)

the second path configured to indicate a presence in the environment of one or more object characteristics corresponding to the predetermined object type; and generate output data using the first and second data, wherein the first and second paths are arranged to be enable the first and second data to be obtained in parallel.

17 Claims, 6 Drawing Sheets

(51) Int. Cl.
 *G06N 3/04* (2006.01)
 *G06T 11/20* (2006.01)
 *G06N 3/08* (2006.01)
(52) U.S. Cl.
 CPC ..... *G06K 9/00335* (2013.01); *G06K 9/00362* (2013.01); *G06N 3/04* (2013.01); *G06N 3/08* (2013.01); *G06T 11/20* (2013.01); *G06T 2210/12* (2013.01)
(58) Field of Classification Search
 CPC .. G06N 3/04; G06N 3/08; G06T 11/20; G06T 2210/12
 See application file for complete search history.

(56) References Cited

OTHER PUBLICATIONS

Simonyan et al., "Very Deep Convolutional Networks for Large-Scale Image Recognition", Visual Geometry Group, Department of Engineering Science, University of Oxford, https://arxiv.org/pdf/1409.1556.pdf.

Ranjan et al., "An All-in-One Convolutional Neural Network for Face Analysis", Center for Automation Research, UMIACS, University of Maryland, College Park, MD 20742, https://arxiv.org/pdf/1611.00851.pdf.

O. Glauner, Patrick, "Deep Learning For Smile Recognition", Jul. 26, 2017, Interdisciplinary Centre for Security, Reliability and Trust, University of Luxembourg, https://arxiv.org/pdf/1602.00172.pdf.

"A multi GPU parallel framework for deep convolutional neural network CNNs and its application", Aug. 20, 2014, http://prog3.com/article/1970-01-01/2821298.

Burkert et al., "DeXpression: Deep Convolutional Neural Network for Expression Recognition", German Research Center for Artificial Intelligence, Kaiserslautern, Germany, https://arxiv.org/pdf/1509.05371.pdf.

Yuguang et al., "Multi-Path Region-Based Convolutional Neural Network for Accurate Detection of Unconstrained 'Hard Faces"; Arxiv.Org, Cornell University Library, 201 Olin Library Cornell University Ithaca, New York 14853 XP080759925; DOI: 10.1109/CRV.2017.20 Section III.A; figures 1,2.

Chen et al., "Dual Path Networks", XP055490091, URL:https://arxiv.org/pdf/1707.01629v1.pdf.

Extended European Search Report dated Jul. 11, 2018 for EP Application No. 17211178.3.

International Search Report and Written Opinion dated Jan. 14, 2019 for PCT Application No. PCT/EP2018/077327.

* cited by examiner

METHODS AND SYSTEMS FOR PROCESSING IMAGE DATA

CROSS-REFERENCE TO RELATED APPLICATIONS

This application is a continuation of International Application No. PCT/EP2018/077327, filed Oct. 8, 2018 which claims priority to GR Application No. 20170100462, filed Oct. 6, 2017 and EP Application No. 17211178.3 filed Dec. 29, 2017, under 35 U.S.C. § 119(a). Each of the above referenced patent applications is incorporated by reference in its entirety.

BACKGROUND OF THE INVENTION

Field of the Invention

The present invention relates to methods and systems for processing image data. The invention has particular, but not exclusive, relevance to processing image data corresponding to people within an environment to generate a metric that can be used, directly or indirectly, to control a system associated with the environment.

Description of the Related Technology

Computer vision is an ever-expanding field that deals in the automation of tasks typically performed by the human visual system. Such tasks include object recognition and feature extraction. Machine learning techniques may be employed to facilitate computer-aided image processing, in particular facilitating interpretation of image contents. For example, artificial neural networks, which are inspired by the structure of biological neural networks, may be trained to recognise patterns or other features in images.

Computer vision techniques have been used to detect not only the presence of humans in a given environment but also a valence characteristic of a detected human, for example whether the human is smiling. In this way, computer vision techniques can be used to infer some form of metric for the emotional state of a human being. Formalising such measurements is a field of ongoing research.

In many applications, it may be desirable to process image data using machine learning more quickly while maintaining a high level of accuracy. For example, when processing a sequence of images sampled from a video stream corresponding to a changing scene, increasing the processing speed for an image allows the image sampling rate to be increased while maintaining "real-time" processing (i.e. the processing of one sampled image is completed in the same as, or less time than, the sampling interval).

SUMMARY

According to a first aspect of the present invention, there is provided a computer-implemented system for processing image data, the system comprising: a sensor operable to capture image data comprising an image of an environment of the sensor; and a processing circuit comprising: a processor; and a computer-readable storage medium comprising computer-readable instructions which, when executed, cause the processor to: receive the image data from the sensor; process the image data using a first path through a neural network to obtain first data, the first path being configured to indicate a presence in the environment of one or more objects of a predetermined object type; process the image data using a second path through a neural network to obtain second data, the second path being configured to indicate a presence in the environment of one or more object characteristics corresponding to the predetermined object type; and generate output data using the first and the second data, wherein the first path and the second path are arranged to be enable the first data and the second data to be obtained in parallel.

As such, object characteristics may be detected simultaneously with the objects themselves. This contrasts with some known systems, where object recognition is performed first, followed by identification of one or more object characteristics. Processing the image data to identify objects and object characteristics in parallel reduces latency and increases processing efficiency compared to a case in which the objects and object characteristics are applied sequentially.

According to a second aspect of the present invention, there is provided a computer-implemented method of processing data, the method comprising: receiving image data from an image sensor, the image data corresponding to an image of an environment; processing the image data corresponding to an image to determine data representative of the presence of objects in the image and image characteristics of the objects; and processing the representative data to determine a valence metric for the environment. This valence metric can be used to monitor the variation in valence of the environment over time. For example, in a retail environment this metric can be used to gauge response to an offer event.

The valence metric also allows environmental properties to be controlled and/or adjusted based on the characteristics of image data captured in that environment. In particular, the environmental properties may be controlled directly or indirectly on the basis of analysed image features relating to a perceived experience of users in the environment. Computer vision may therefore be used to infer a measure of environmental experience associated with images acquired of environments within which humans work and play.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
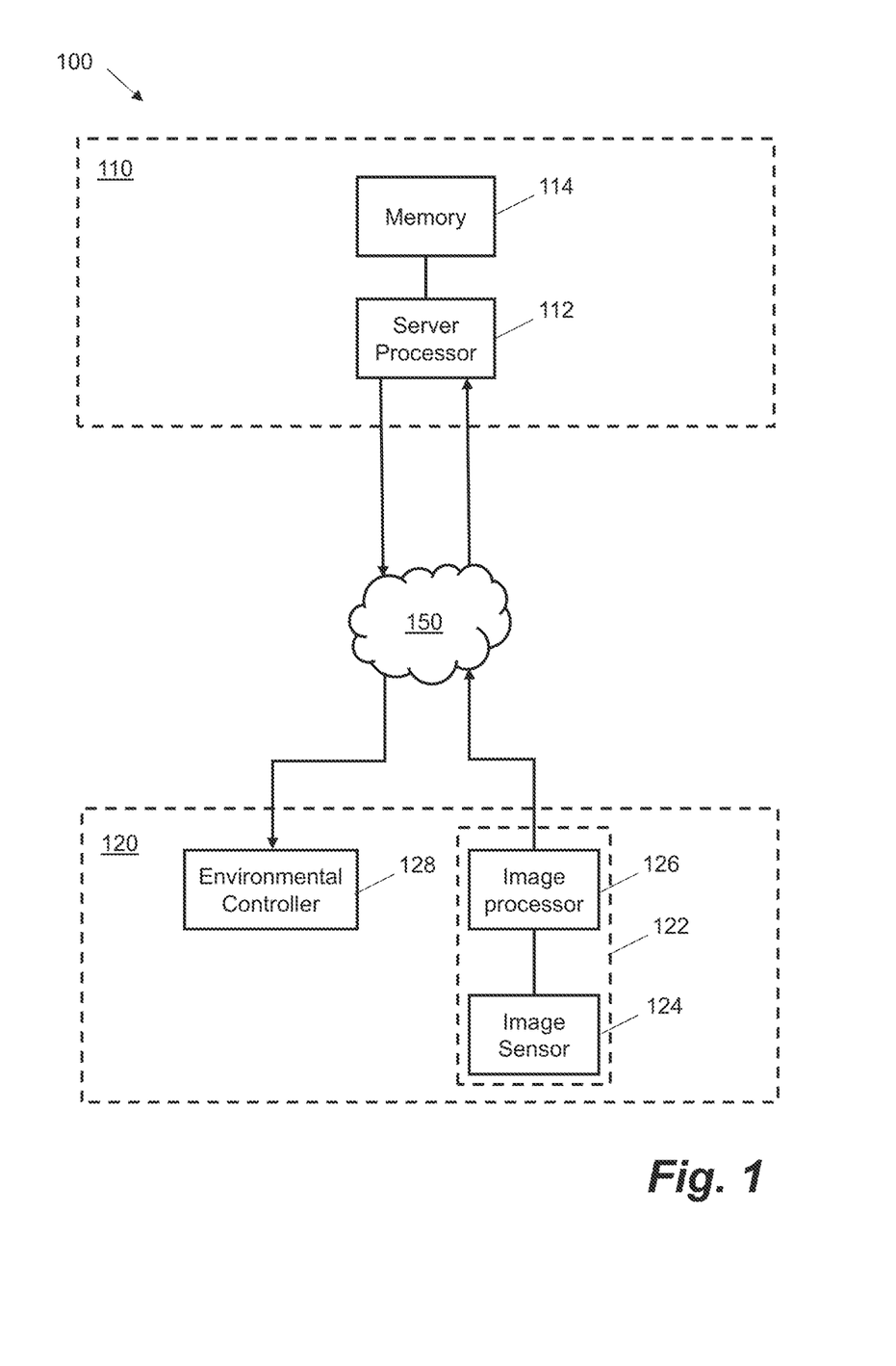
FIG. 1 schematically shows a first example of a data communications system.

Referring to FIG. 1, there is shown an example of a data communications system 100 in accordance with the present invention. Data communications system 100 includes server apparatus 110 and client apparatus 120. In this example, server apparatus 110 and client apparatus 120 are located remotely relative to one another and are able to communicate via data communications network 150. The data communications network 150 may involve any network technology, or combination of network technologies, are to communicate data between two remote apparatuses. For example, the data communications network may involve one or more of the Internet, a Local Area Network (LAN), a Wide Area Network (WAN) and a cellular network. Server apparatus 110 and/or client apparatus 120 may have a wired and/or a wireless connection to the data communications network 150.

Server apparatus 110 comprises a processor 112 and memory 114. Memory 114 contains storage, working memory, and cache. Working memory includes Random Access Memory (RAM) and Read Only Memory (ROM). Storage may include one or more of: hard disk drives; optical disk storage; flash memory; and solid state drives. The server apparatus may include one or more further components (not shown), such as a network interface, system bus and power supply.

Client apparatus 120 comprises computer vision system 122 arranged to generate and process image data. The computer vision system 122 includes an image sensor 124 and an image processor 126. In this example, the image sensor 124 and the image processor 126 are co-located, it being understood that in other examples the image sensor 124 and the image processor 126 could be arranged in separate locations.

Image sensor 124 is, for example, a camera including an array of charge-coupled device (CCD) sensors or complementary metal-oxide semiconductor (CMOS) sensors. It will be appreciated that other types of image sensing technology could be used. Image sensor 124 is arranged to capture image data for an associated field of view of a surrounding environment, and accordingly records an image of the environment of the image sensor 124. In some embodiments, image sensor 124 is arranged to capture image data in response to a trigger event. Examples of trigger events include motion detection and light detection. In some embodiments, the image sensor 124 is arranged to capture image data corresponding to a sequence of images. Such a sequence of images may correspond to sequential frames of a captured video.

Although image processor 126 is referred to herein as a 'processor' for brevity, it will be understood that image processor 126 corresponds to a processing circuit comprising both one or more processors and memory. The memory includes a storage medium comprising computer-readable instructions executable by the processor.

The image data captured by image sensor 124 is processed by image processor 126, as will be described in more detail below. As will be described in more detail hereafter, the image processor 126 processes the image data to identify both objects and at least one characteristic of the identified objects. Based on the identified objects and object characteristics, the image processor generates and outputs prediction data based on the identified objects and object characteristics. The prediction data is then transmitted, via network 150, to the server apparatus 110 for further processing.

The image data, having been processed by the client apparatus 120, is discarded, and is not transmitted to the server apparatus 110. Discarding the image data reduces an amount of storage space required at the client apparatus 120 and/or reduces an amount of data that is transported via the network 150. Discarding the image data also results in no data being stored (beyond transient storage while the image data is being processed) at or transmitted from the locality of the client apparatus 120 which could potentially identify a specific individual. The prediction data cannot be used to identify a specific individual.

The server apparatus 110 processes the received prediction data to generate feedback data, which is transmitted via the network 150 to environmental controller 128. In this example, environmental controller 128 is part of the client apparatus 120. In other examples, environmental controller 128 is separate from the client apparatus 120. As will be discussed in more detail hereafter, the feedback data may include one or both of a metric for the environment and control data for the environmental controller. In response to the control data, the environmental controller 128 alters the physical environment of the image sensor 124, namely the environment represented by the image captured by the image sensor 124. As such, the environment corresponding to the captured image may be controlled on the basis of prediction data derived using a captured image.

In an example, the image processor 126 is programmed to identify the presence of human beings, or parts of human beings, in the image corresponding to the image data (i.e. the objects are human beings), and also to identify whether or not the human beings are smiling (i.e. the object characteristic is whether or not a human being is smiling). The server processor 112 is programmed to process the prediction data to calculate a "valence" metric of the environment. Valence can be considered a measure of the level of delight existing within the environment. The server processor may also determine a change of environment that is expected to improve the valence, and then generate control data conveying instructions for effecting that change of environment.

The functions of the components of the system of FIG. 1 will now be outlined in more detail in the context of a typical data processing operation.

Figure 2:
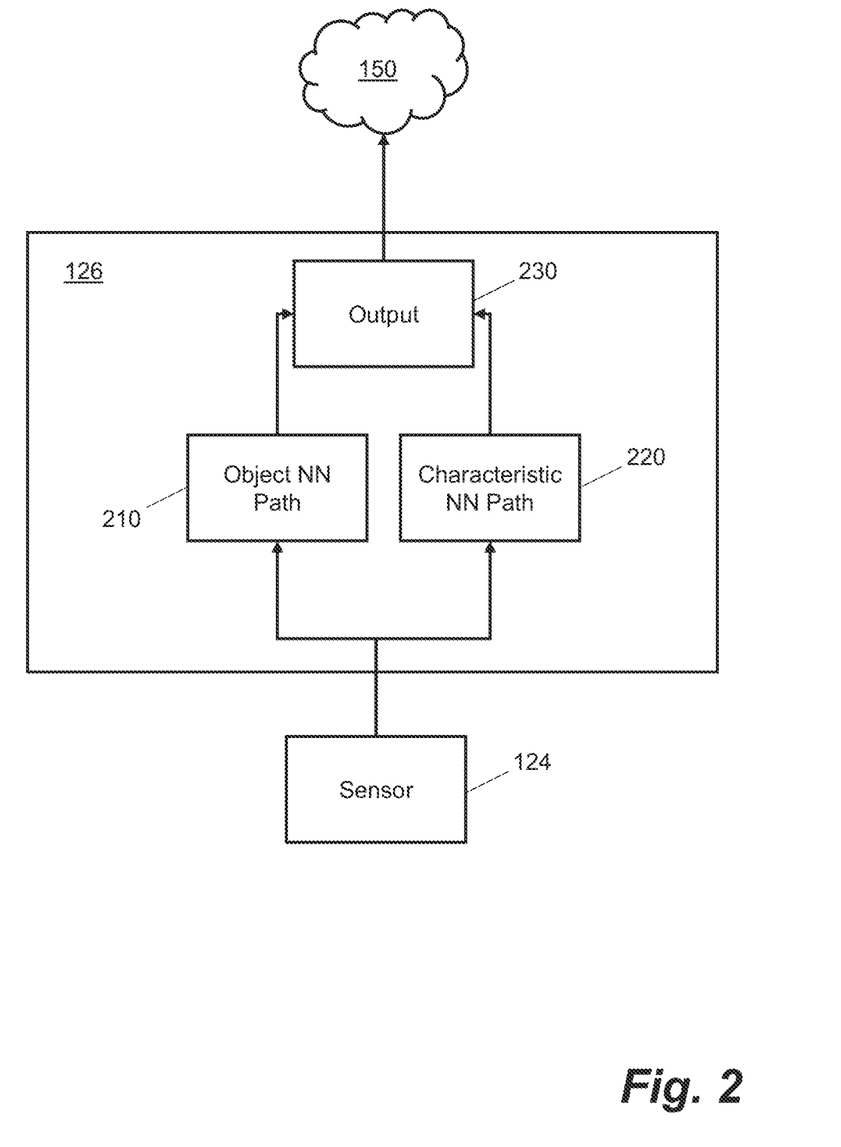
FIG. 2 schematically shows an image processor in the system of FIG. 1.

Referring to FIG. 2, there is shown functional components of image processor 126.

Image processor 126 receives image data from sensor 124.

Image processor 126 processes the received image data using a neural network. As shown in FIG. 2, there are two parallel paths 210, 220 through the neural network. The first neural network path 210 is configured to indicate a presence of one or more objects of a predetermined object type. In an example, the predetermined object type is a human face, although in other examples other types of object may be identified by the first neural network path 210. An object type is typically a predetermined part of a human body, although non-human object types may also be used such as other animals.

The second neural network path 220 is configured to indicate a presence of one or more object characteristics corresponding to the predetermined object type. In this example, where the predetermined object type is a face, the object characteristic is a smile. It will be understood that other object characteristics may be recognised in other examples. An object characteristic typically corresponds to a particular object type. For example, a smile is a characteristic of a face, a posture is a characteristic of an upper body, a stance is a characteristic of a lower body, a gesture is a characteristic of a hand or arm, and so on.

As such, in this example, faces and smiles are identified by the first and second neural network paths 210, 220 in parallel. This is in contrast with known systems, where face detection and smile recognition are performed serially. Typically, face detection is performed first in such known systems, the face detection output being used to normalise an image prior to smile recognition. In contrast, the first and second neural network paths 210, 220 simultaneously perform face detection and smile recognition.

The image data is processed using the first neural network path 210 to obtain first data. In this example, the first data includes a face confidence score. A face confidence score is a determined probability that a face is present at a given location. The location may be defined by the coordinates of a bounding box. The image data is processed using the second neural network path 220 to obtain second data. In this example, the second output data includes a smile confidence score. A smile confidence score is a determined probability that a smile is present at a given location. The first and second data are used to generate prediction data 230. This could simply involve concatenating the first data and the second data, although alternative processing operations could be used. The prediction data 230 is output for transmission via the network 150.

Figure 3A:
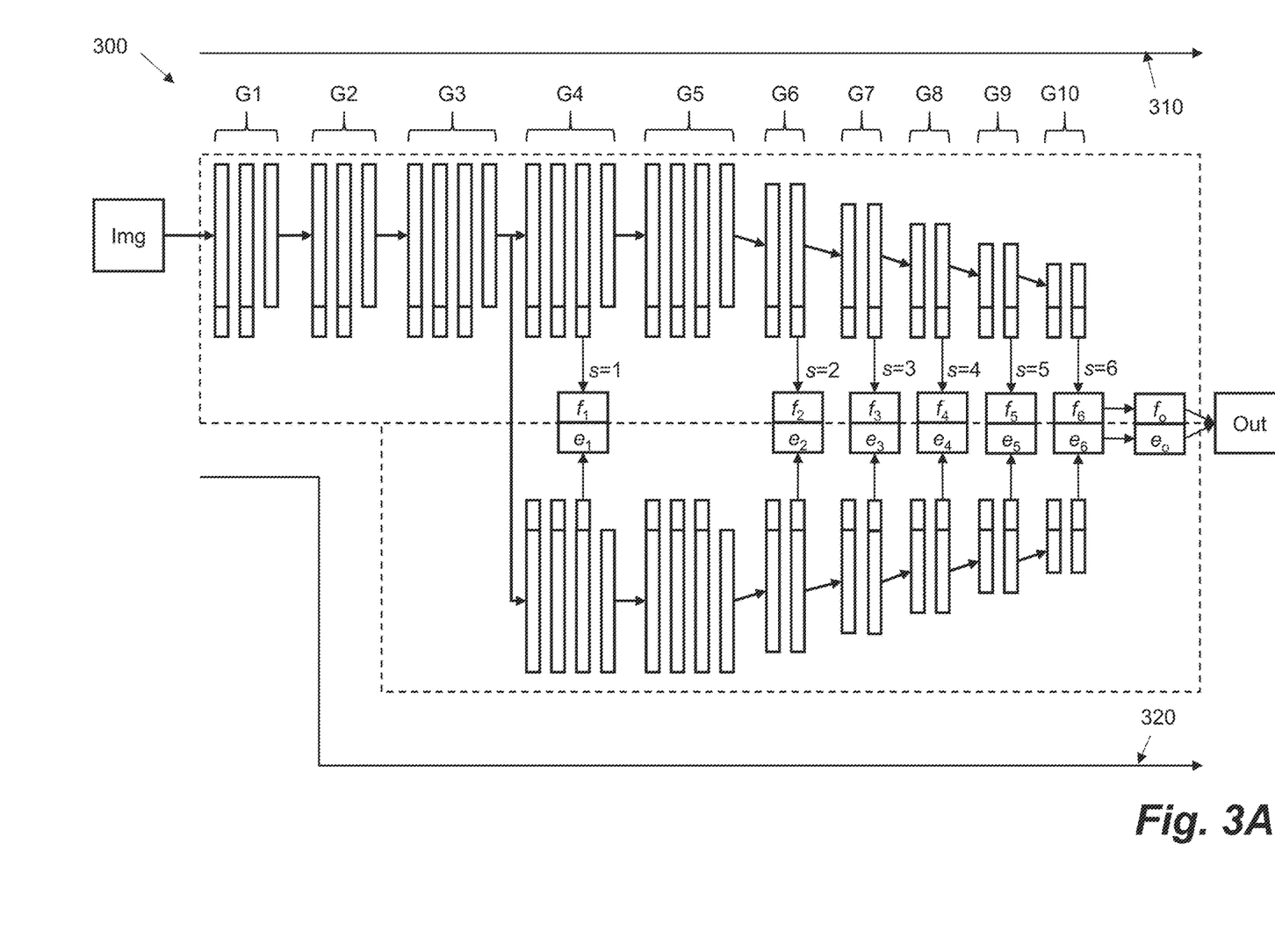
FIGS. 3A and 3B schematically show a neural network architecture for use in the system of FIG. 1.
Figure 3B:
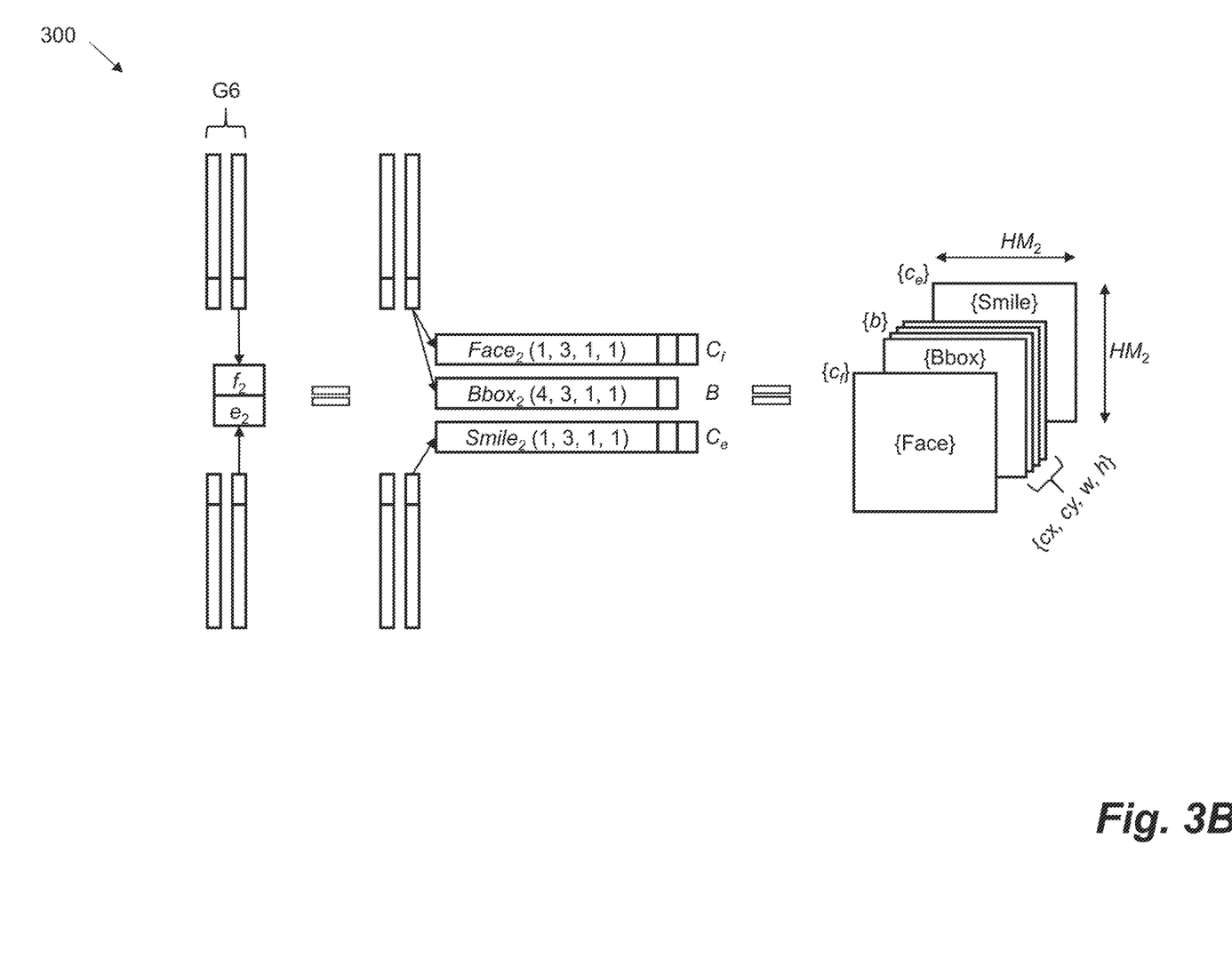

Performing face detection and smile detection in parallel presents technical challenges. Referring to FIGS. 3A and 3B, there is shown a neural network 300 for use in image processor 126 to perform face detection and smile detection in parallel.

The neural network 300 is a scale-invariant object detector that uses multi-scale output layers. The neural network 300 includes the two neural network paths 310, 320 that are configured in parallel. In this example, the neural network 300 is a fully convolutional neural network. A convolutional neural network is a type of deep, feed-forward artificial neural network. The convolutional neural network 300 has convolution layers and pool layers. G[1:10] represents convolution and pool layer groups having the same input resolution. For example, G2 comprises two convolution layers and one pool layer, whereas G6 comprises two convolution layers only. The neural network 300 accepts as an input a colour image.

In this example, the first neural network path 310 is configured to detect faces and the second neural network path 320 is configured to detect smiles.

In this example, convolution layers in groups G[1:3] are shared between the first neural network path 310 and the second neural network path 320. That is, layers in G4 of the second neural network path 320 receive information from layers in G3 common to the first neural network path 310 and the second neural network path 320. Sharing the initial convolution layers between the first and second neural network paths 310, 320 reduces the overall number of layers and thus reduces latency and complexity and increases the processing efficiency of architecture 300.

The neural network 300 comprises six output layers, each corresponding to a given scale s. At each output layer, a heatmap volume generated by multiple convolution layers is output, namely [$(f_1, e_1):(f_6, e_6)$]. $f_1:f_6$ are produced by the face detection network 310. $e_1:e_6$ are produced by the smile recognition network 320. The output convolution layers of the two different neural network paths 310, 320 are aligned and concatenated. Each concatenated output convolution layer outputs a pixel-wise heatmap volume consisting of six heatmap planes. An example of the concatenated output convolution layer for the second scale (s=2) is shown in FIG. 3B. The concatenated output convolution layer for the second scale (s=2) outputs a three-dimensional volume ($HM_2 \times HM_2 \times 6$) consisting of six heatmap planes having the same resolution ($HM_2 \times HM_2$) of the second scale. The first plane indicates the presence of a face. The final plane indicates the presence of a smile. The intermediate four planes indicate the offset position of centre coordinates (cx, cy) relative to each pixel position, width w, and height h relative to the current heatmap scale s that form the bounding box, respectively. As such, each output layer provides a set of predicted output pairs that include a face confidence score, bounding box parameters and a smile confidence score $\{c_f, b, c_e\}_s$ at every pixel location in the input image.

The neural network 300 simultaneously learns the labels of the face class $\alpha_f$, the bounding box $\beta$, and smile class $\alpha_e$ at each output layer. On the basis of the face confidence score $\{c_f\}$ that appears on each pixel in the face heatmap $C_f$, several candidates of the bounding box and smile confidence score are filtered. A set of representative bounding boxes and the corresponding smile confidence scores are then determined, for example using Non-Maximum Suppression. As such, the smile confidence scores for given pixels are adjusted using the face confidence scores for those pixels. Adjusting smile confidence scores on the basis of face confidence scores may increase an accuracy of smiling face detection performed by the architecture 300.

In this example, a single aspect ratio is used for the bounding box to facilitate alignment. A default box is used to assign a ground truth label to a pixel position in a heatmap. A square bounding box fits well around the shape of a face, regardless of pose or facial deformations. Using only one square aspect ratio to match the default box may reduce the kernel size of the output convolution layers compared to a case in which multiple different aspect ratios are used.

In this example, the convolution layers in the neural network 300 are followed by a Rectified Linear Unit (ReLU) activation function, except for the output convolution layers (e.g. $f_1$, $e_1$). For the output convolution layers, a sigmoid function comes after the layer for face and smile binary classification. The layers for bounding box regression use linear values. The parameters of the convolution layers follow the order of number of kernels, kernel size, stride and padding. The parameters of the pool layers follow the order of kernel size, stride and padding.

The neural network 300 can accept as an input a captured real world (sometimes referred to as 'in the wild') image and produces a smiling face detection output. This contrasts with previous smile detection systems which typically require some form of normalisation prior to smile detection, which may include face detection and registration. The architecture 300 is able not only to detect faces in a given colour image, but also to estimate, in parallel, the confidence score of a smiling face associated with a detected face. Processing naturally captured images without a normalisation step reduces latency and increases processing efficiency compared to a case in which a normalisation step is used.

The training of the neural network 300 according to an example will now be described. Training involves recursively calculating losses (including, for example, face classification, bounding box regression and smile classification) and updating parameters in the neural network 300 accordingly. For ease of reference, the first neural network path 310 will be referred to as the face detection network 310 and the second neural network path will be referred to as the smile detection network 320.

Initially, parameters of the convolution layers of the VGG16 network (as described in the article "Very deep convolutional networks for large-scale image recognition" by Simonyan and Zisserman in International Conference on Learning Representations (ICLR) 2015, the whole contents of which are hereby incorporated by reference) are used for groups G[1:5] of the neural network 300. The smile detection network 320 is then frozen while the face detection network 310 is adjusted using a reference dataset. The face detection network 310 may be adjusted using a predetermined cost function. The parameters of the layers in groups G[4:10] of the face detection network 310 are then copied to the corresponding layers of the smile detection network 320. As such, the fine-tuned parameters of the face detection network 310 are inherited by the smile detection network 320. The face detection network 310 is then frozen and the smile detection network 320 is adjusted using a reference dataset. Selectively inheriting characteristics of the models trained with different datasets facilitates an increase in the accuracy and/or a processing efficiency of the neural network 300.

Adjusting the face detection network 310 uses an objective loss function $L_{face}$, which is a weighted sum of the face classification loss $L_{cls}$ and the bounding box regression loss $L_{reg}$. $L_{face}$ is defined as:

$$L_{face}(x_f, c, l, g) = \frac{1}{N}(L_{cls}(x_f, c) + \lambda x_f L_{reg}(l, g)),$$

where N is the total number of matched default boxes. For the regression loss $L_{reg}$, smooth$_{L1}$ loss is used for calculating the distance between predicted $l=\{l_{cs}, l_{cy}, l_w, l_h\}$ and the ground truth $g=\{g_{cs}, g_{cy}, g_w, g_h\}$ bounding boxes, as set out in the equations below. The regression loss is activated only when the indicator $x_f \in \{1, 0\}$ for matching the default box $d=\{d_{cx}, d_{cy}, d_w, d_h\}$ to face existence is identified as True (that is, $x_f=1$), and is disabled otherwise (that is, $x_f=0$).

$$L_{reg}(l, g) = \sum_{m \in \{cx,cy,w,h\}} smooth_{L1}(l_m - \hat{g}_m),$$

$$\hat{g}_{cx} = \frac{g_{cx} - d_{cx}}{d_w}, \hat{g}_{cy} = \frac{g_{cy} - d_{cy}}{d_h}, \hat{g}_w = \log\left(\frac{g_w}{d_w}\right), \hat{g}_h = \log\left(\frac{g_h}{d_h}\right),$$

where $$smooth_{L1}(k) = \begin{cases} 0.5k^2, & \text{if } \|k\| < 1 \\ \|k\| & \text{otherwise} \end{cases}.$$

The face classification loss $L_{cls}$ is based on binary cross entropy over face confidence scores c:

$$L_{cls}(x_f, c) = -x_f \log(c) - (1-x_f)\log(1-c).$$

A positive matched box $x_f=1$ for a face is indicated based on the ground truth label. However, a negative matched box $x_f=0$ that represents a background region of the image is indicated in the process of Hard Negative Mining (HNM). In the process of HNM, the calculated losses are sorted only in the background region ($\neg(x_f=1)$) in descending order. The highest losses are then selected and used as the classification result for the negative region. The loss balancing weight $\lambda$ is set to 1 in this example, but can be set to a higher value (e.g. 2) depending on the desired bias towards better box locations.

During training, the output values that appear in heatmaps corresponding to the bounding box and the smile(s) are examined only when the corresponding face label exists for a given pixel.

Adjusting of the smile detection network 320 uses a smile classification loss function $L_{smile}$. $L_{smile}$ and is calculated using a binary cross entropy over smile confidence scores e, as shown in the below equation. In contrast to the face detection network 310, all positive and negative matched boxes $x_e \in \{1, 0\}$ are indicated based on the ground truth smile label. Consequently, the process for adjusting the smile detection network 320 does not require HNM.

$$L_{smile}(x_e, e) = -x_e \log(e) - (1-x_e)\log(1-e)$$

By freezing the face detection network 310, adjusting the smile detection network 320 does not impair face detection performance, and vice-versa. A same location of the face bounding box may be annotated across the dataset. By annotating the same location of the face bounding box across the dataset, smile recognition may be trained without a normalisation step, such as face detection and registration. Performing smile recognition without a normalisation step increases a processing efficiency and reduces latency in the smiling face detection training process.

During training of the neural network 300, input image data is augmented in order to produce images having different sizes, shapes and/or lighting properties, in order to increase the flexibility and accuracy of the neural network 300 in smiling face detection. In a specific example, the neural network 300 receives as input a 300×300 resolution and 3 colour channel (e.g. red, green and blue) image. Prior to data augmentation, pixel values for the red, green and blue channels of a sample image are normalised based on the mean and standard deviation values of the entire training dataset. Each sample image is first flipped in the horizontal direction with a probability of 0.5. During training, one of the following data augmentation mechanisms is randomly selected and applied to create noise-applied data samples: shrinking, cropping and gamma correction.

Shrinking involves randomly selecting a real number between 0 and 1 and using the selected number to scale both the image height and width. For example, if the selected number is 0.5, the resolution of the augmented image is half the resolution of the original image. The ratio of image width and height is maintained during shrinking. If the augmented image has a resolution that is less than 300×300, the background is filled with random colour.

Cropping involves randomly selecting a partial area of the original image. The cropped image is then rescaled to 300×300 pixels. The face of the original image is thus enlarged in the cropped image. If the selected area contains less than half of the original face region, one or more further areas are selected.

Gamma correction involves randomly selecting one of the red, green and blue colour channels. A randomly generated gamma correction value is then applied to the selected colour channel. This process may be repeated for the other colour channels. Individually corrected image planes (each plane corresponding to a different colour channel) are then combined to produce a colour image having different lighting properties compared to the original image. As such, the architecture 300 may be adaptable to different lighting conditions.

After the training process, the neural network 300 is tested. For example, 75% of a dataset may be used for training and the remaining 25% used for testing. Smiling face detection is based on separate face and smile confidence scores. If the face confidence score for a given face candidate exceeds a predetermined face threshold, th$_{face}$, the set of pixel positions of the face candidate is classified as a face. A set of bounding box candidates is then derived using the pixel positions. The representative faces among the candidates are then detected, for example using Non-Maximum Suppression (NMS). If the smile confidence score associated with a representative bounding box exceeds a predetermined smile threshold, th$_{smile}$, the bounding box is arranged to indicate the presence of a smiling face.

In this example, only the face region is considered when calculating the smile recognition loss. Although the training samples of the dataset are used for distinguishing between smile and non-smile, the background area including non-face regions is not considered in the training process for smile recognition. A random prediction value for the smile recognition is output for the non-face areas. The predicted confidence score of the smile appearing in the background area is not considered in the smiling face detection process.

Figure 4:
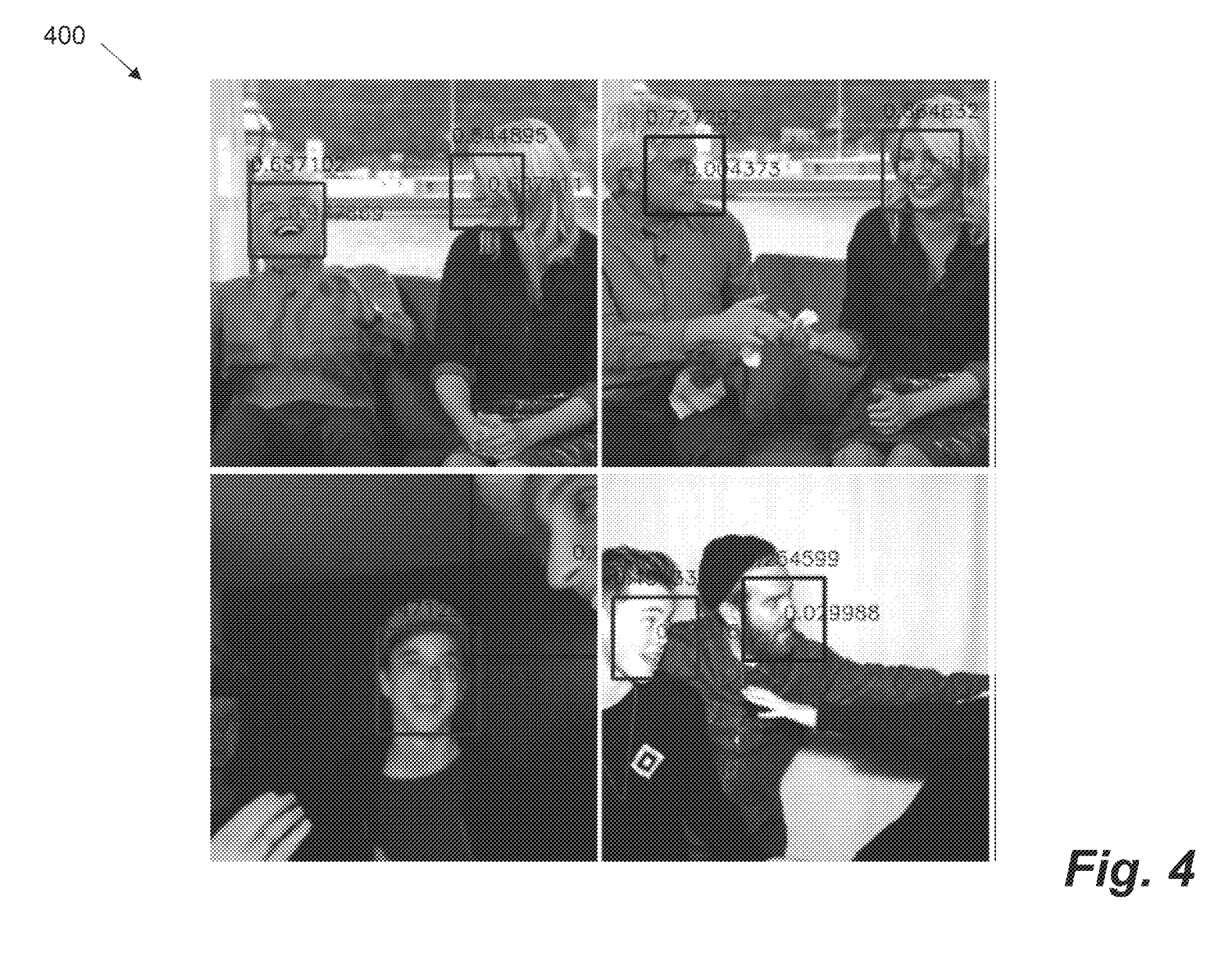
FIG. 4 shows an example output of the neural network architecture of FIGS. 3A and 3B.

Referring to FIG. 4, there is shown a set of four images together with a visual representation of prediction data output from the neural network 300 for t set of four images.

In each of the images shown in FIG. 4, when a detected face is determined to be a smiling face, the colour of the bounding box changes from black to grey. The probability that appears at the top of the bounding box indicates the face confidence score (from 0 to 1). The probability that appears in the middle of the box indicates the smile confidence score (from 0 to 1).

Figure 5:
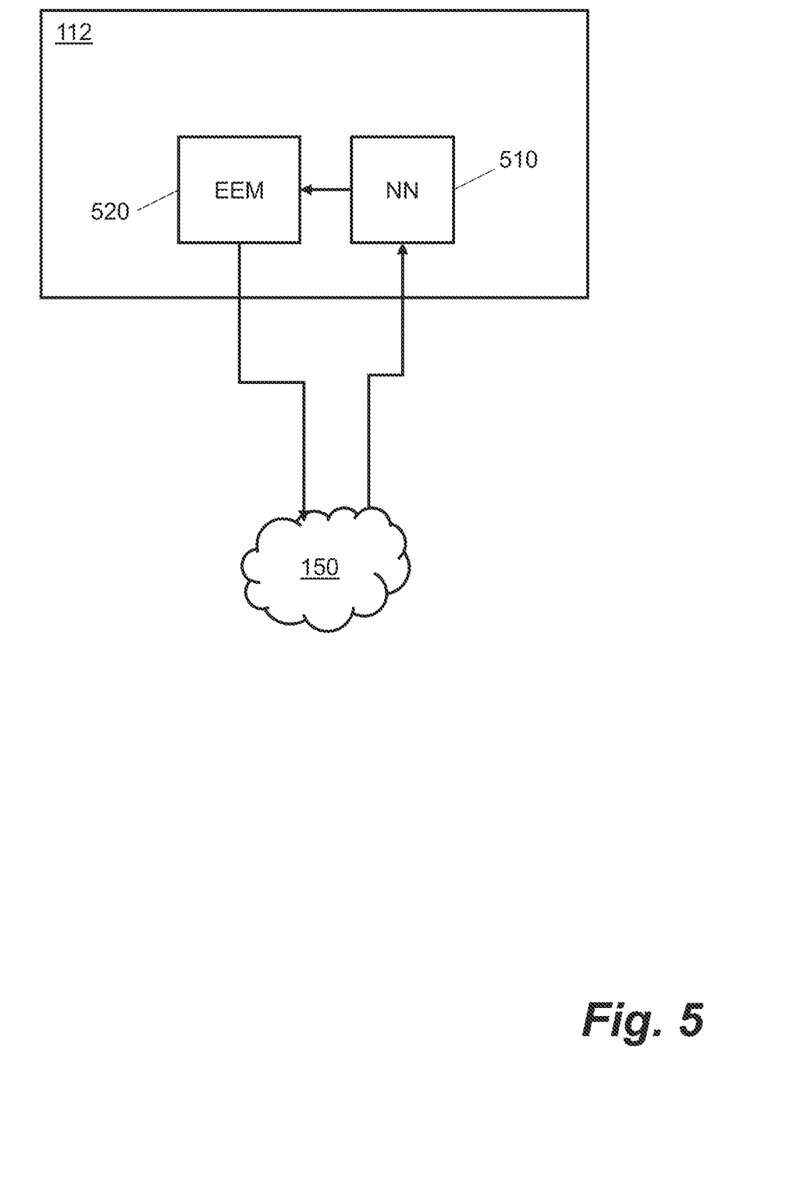
FIG. 5 schematically shows a server processor in the system of FIG. 1.

Referring to FIG. 5, there are shown functional components of server processor 112 of the server apparatus 110.

Although server processor 112 is referred to herein as a 'processor' for brevity, it will be understood that server processor 112 corresponds to a processing circuit comprising both one or more processors and memory. The memory includes a storage medium comprising computer-readable instructions executable by the processor.

Server processor 112 receives, via the data communications network, prediction data. As described above, the prediction data is derived at the client apparatus 120 using image data from image sensor 124. In this example, the prediction data comprises first data indicating a presence of a face and second data indicating a presence of a smile.

Server processor 112 processes the prediction data using a neural network 510. The neural network 510 is configured to derive an environment experience metric (EEM) 520 using the prediction data. The neural network 510 is trained to correlate prediction data to the EEM 520. Other examples may not use a neural network to correlate prediction data to an EEM, and may instead use other regression algorithms such as vector support machines, linear regression, logistic regression, and decision trees.

The EEM 520 is a measure relating to the perceived experience of users in the environment of the image sensor 124. As such, the EEM 520 corresponds to users in the environment. The term 'user' is used herein to refer to a human that is experiencing the environment. A perceived experience may correspond to a perception of the user experience as determined by experts or trained observers of the images. For example, trained observers may generate labelled EEM training data by manually assign scores to a set of images of users in accordance with a set of predetermined criteria corresponding to the EEM. The neural network 510 may then be trained as a regression network using the labelled EEM training data, such that the neural network 510 may subsequently correlate prediction data to the EEM. The predetermined criteria corresponding to the EEM may relate to a perceived level of satisfaction, engagement, awareness, enthusiasm, interest, attentiveness, dissatisfaction, suspicion or nonchalance of users in the environment, or the perceived level of attractiveness and/or desirability of the environment to the users in it. In this example, the higher the EEM 520 at a given moment in time, the more emotionally engaged the users are perceived to be. The EEM 520 may be derived from a combination of the prediction data and other, context-specific factors. Context-specific factors may be predetermined and specified in a configurator module of the server apparatus 110. Context-specific factors are factors which are specific to a given context, e.g. a type of environment. Examples of context-specific factors include, but are not limited to: the maximum user occupancy of the environment (crowding); postures typical to the environment; a staff presence typical to the environment; a child presence typical to the environment; facial expressions typical to the environment; upper-body gestures typical to the environment; lower-body gestures typical to the environment; mapping of particular fixtures or products within the environment; light levels typical to the environment; noise levels typical to the environment; and temperature and humidity levels typical to the environment.

The EEM 520 is calculated and/or stored as a time series. Each set of received prediction data corresponds to an image captured at a given moment in time. The sets of prediction data for different times are used to derive an EEM time series. In this example, the EEM time series is stored in a data layer, e.g. a memory, of the server apparatus 110. The stored time series allows historic data to be provided to clients and/or other entities. Additionally or alternatively, the EEM data may be provided to clients and/or other entities as a live feed or real-time data stream. For example, the prediction data may be transmitted to the server apparatus 110 and processed in substantially real time to enable the server apparatus 110 to determine a continuous measure of the instantaneous EEM for the environment. The EEM data may be provided to the client apparatus as part of a subscription service. The EEM data may be output via an application programming interface (API) layer of the server apparatus 110. Using the API layer allows EEM time series data associated with the sensor 124 to be rewound, fast-forward or played at different speeds.

In this example, neural network 510 is a feed-forward neural network. In other examples, neural network 510 is a recurrent or convolutional neural network. In addition to the prediction data, neural network 510 may predict an EEM using other forms of input and/or training. Examples of other types of input include, but are not limited to, weather conditions local to the sensor 124, local events in the vicinity of the sensor 124, audio or temperature data from other sensors, and sales or transaction data associated with a locality in which the sensor 124 is located. As such, neural network 510 may in fact be made up of a number of neural networks or predictors of different types.

Server processor 112 generates the feedback data using the EEM 520. The feedback data corresponds to at least part of the EEM time series. In some embodiments, the feedback data comprises EEM data. In other embodiments, the feedback data comprises an environmental control signal derived based on the EEM data.

The feedback data is transmitted via the network 150. In this example, the feedback data is transmitted to environmental control apparatus 128 which, as described above, may be part of client apparatus 120 or separate from client apparatus 120. The feedback data enables the environmental control apparatus 128 to control the environment of the sensor 124 on the basis of the derived EEM 520. For example, the feedback data may comprise a control signal to control the environmental control apparatus 128 automatically. The feedback data may cause the environmental control apparatus 128 to adjust environmental factors such as lighting, heating, volume, music, or various other environmental factors in the environment of the sensor 124. In a specific example, the derived EEM 520 may be indicative of users in the environment not being sufficiently engaged with the environment. As a consequence, the feedback data generated based on the EEM 520 causes the environmental control apparatus 128 to control the environment by causing music to be played in the environment. The engagement of users with the updated environment can subsequently be determined as described above, namely by extracting features from a captured image to generate prediction data, and then by deriving an EEM on the basis of the generated prediction data.

In some embodiments, the feedback data causes an alert to be activated at the environmental control apparatus 128. Such an alert may be detected by a user of the environmental control apparatus 128. The user may then operate the environmental control apparatus 128 to control the environment on the basis of the alert.

Server processor 112 may be considered an inference engine, as it infers an EEM based on received input data derived from sensor data. Processor 112 can take input data from multiple sources, one of which is client apparatus 120. For example, multiple environments may be monitored and/or controlled simultaneously, each environment having separate sensors, image processors and/or environment controllers.

The above embodiments are to be understood as illustrative examples of the invention. Further embodiments of the invention are envisaged.

In some embodiments, client apparatus 120 has different configurations to those described in FIG. 1 or 2. For example, in some embodiments the sensor is not part of the client apparatus 120 but is communicatively coupled to it. In other embodiments, the environmental controller is arranged in a separate location to the client apparatus 120 but is able to communicate with and/or control the environment of the client apparatus 120. For example, the client apparatus 120 may be arranged in a shop or café and the environmental controller may be arranged in an off-site Information Technology (IT) system.

In some embodiments, multiple sensors are used in a given environment. Each of the multiple sensors may capture an image of a different part of the environment, or from a different perspective in the environment. Image data from each of the sensors may be processed by image processor 126. In some embodiments, there may be multiple instances of image handling system 122 arranged in the same environment. Prediction corresponding to each of the sensors (or image handling systems) may be transmitted to server apparatus 110 and used to derive the EEM 520.

In embodiments described above, objects/object characteristics identified from image data include smiling faces. In some embodiments, other objects/object characteristics are extracted from the image data. Examples of possible features that may be extracted include: a number of persons in the environment; relative occupancy of the environment; posture of persons in the environment; presence of staff; presence of children; light levels in the environment; noise levels in the environment; temperature and/or humidity levels in the environment; person to person interactions in the environment; person to fixture interactions in the environment; person to product interactions in the environment; upper-body gestures; lower-body gestures; and facial expressions other than smiles, e.g. frowns or other emotional expressions.

In some embodiments, more than two neural network paths are used in the image processor 126. Each neural network path may be configured to recognise a different object type or a different object characteristic. For example, a first neural network may be configured to perform face detection, a second neural network may be configured to perform smile recognition (relating to, and run in parallel with, face detection), a third neural network may be configured to perform body detection and a fourth neural network may be configured to perform posture recognition (relating to, and run in parallel with, body detection). In some embodiments, multiple different object characteristics corresponding to a single object type are recognised. For example, upper body gestures, lower body gestures, and bodily posture may all be recognised in parallel with body detection.

In some embodiments, sensors and/or image handling systems are arranged into groups. A group of sensors may be referred to as a 'virtual sensor'. EEM data may be generated for each sensor in the group, and aggregated into a single EEM time series for the 'virtual sensor'. Feedback data corresponding to a virtual sensor, e.g. received via the API layer of the server apparatus 110, is therefore based on the aggregated EEM time series of the underlying EEM data for sensors in the group.

In some embodiments, input images of various sizes may be handled by image handling system 122. The neural network architecture implemented in image processor 126 may accept image data having a resolution of 300×300 pixels, it being understood that the neural network architecture accepts image data having different resolutions in other embodiments. The image data accepted by the architecture can be obtained from a larger image. For example, a 4K image having a resolution of 3840×2160 pixels may be captured by a camera. Such a high resolution image may be downsampled (for example via pixel averaging) in order to obtain a lower resolution image. In some embodiments, however, a sample or window of the high resolution image is selected and used as input data for the feature extraction architecture. The sample may be randomly selected. A sample selected from a first image at a first point in time may correspond to a different location in the image than a sample selected from a second image at a second point in time. The sample selected from the second image may correspond to an adjacent location relative to the sample selected from the first image, or may be randomly selected. As such, different locations in the environment may be analysed at different times. In some embodiments, multiple different samples of a single image are analysed sequentially and corresponding features extracted. Sampling different image locations in this manner may improve the efficacy of the EEM derived for the corresponding environment.

The processors described herein are typical examples of processor circuitry which, when programmed with suitable instructions, are operable to perform routines in accordance with the present invention. However, it will be appreciated that other examples of processor circuitry could be used for some or all of the steps described. For example, the processor circuitry used to perform the routines may include multiple processors located within multiple devices, and each processor may have multiple processor cores.

Methods described herein may be implemented by way of computer program code that is storable in a memory. Memory may be any non-transitory computer-readable media able to contain, store, or maintain programs and data for use by or in connection with an instruction execution system. Such media may be any physical media such as, for example, electronic, magnetic, optical, electromagnetic, or semiconductor media. More specific examples of suitable media include, but are not limited to, a hard drive, RAM, ROM, erasable programmable read-only memory, or a portable disc. Elements of the memory used to store program code may be volatile or non-volatile and may include additional functionality, for example to minimise latency.

Further aspects of the invention are set out in the following numbered clauses:

1. A computer-implemented system for processing image data, the system comprising:
   a sensor operable to capture image data comprising an image of an environment of the sensor; and
   a processing circuit comprising:
   a processor; and
   a computer-readable storage medium comprising computer-readable instructions which, when executed by the processor, cause the processor to:
   receive the image data from the sensor;
   process the image data using a first path through a neural network to obtain first data, the first path being configured to indicate a presence in the environment of one or more objects of a predetermined object type;
   process the image data using a second path through a neural network to obtain second data, the second path being configured to indicate a presence in the environment of one or more object characteristics corresponding to the predetermined object type; and
   generate output data using the first and the second data,
   wherein the first path and the second path are arranged to enable the first data and the second data to be obtained in parallel.

2. A system according to clause 1, wherein the neural network comprises a convolutional neural network.

3. A system according to clause 1 or 2, wherein the first data comprises a first map of confidence data indicative of the presence of one or more objects of the predetermined object type, and wherein the second data comprises a second map of confidence data indicative of the presence of one or more object characteristics of the predetermined object type.

4. A system according to any preceding clause, wherein the computer-readable instructions cause the processor to adjust the second data using the first data.

5. A system according to any preceding clause, wherein the computer-readable instructions cause the processor to discard the image data received from the sensor following the deriving of the associated prediction data.

6. A computer-implemented method of processing image data, the method comprising:
   receiving the image data;
   processing the image data using a first path through a neural network to obtain first data, the first path being configured to indicate a presence in the environment of one or more objects of a predetermined object type;
   processing the image data using a second path through a neural network to obtain second data, the second path being configured to indicate a presence in the environment of one or more object characteristics corresponding to the predetermined object type; and
   generating output data using the first data and the second data,
   wherein the first path and the second path are arranged so that the first data and the second data are obtained in parallel.

7. A method according to clause 6, wherein the neural network comprises a convolutional neural network.

8. A method according to any of clauses 6 to 7, wherein the neural network is arranged to process the image data using multiple layers, and wherein the first path and the second path share initial layers.

9. A method according to clause 8, wherein each of the first path and the second path comprises a sequence of groups of layers, wherein each of the first path and the second path comprise groups of layers following the initial shared layers corresponding to respective different scales.

10. A method according to clause 9, wherein for each scale the neural network is arranged to generate in each of the first path and the second path a map of confidence data for each scale, determine a bounding box for each portion of confidence data from the first path indicative of an object, and align a corresponding bounding box for the map of confidence data generated by the second path.

11. A method according to clause 10, wherein the bounding boxes have fixed aspect ratios.

12. A method according to any of clauses 6 to 11, wherein the received image data is in the wild image data.

13. A method according to any of clauses 6 to 12, wherein the first data comprises a first map of confidence data indicative of the presence of one or more objects of the predetermined object type, and wherein the second data comprises a second map of confidence data indicative of the presence of one or more object characteristics of the predetermined object type.

14. A method according to any of clauses 6 to 13, the method comprising adjusting the second data using the first data.

15. A method according to any of clauses 6 to 14, the method comprising discarding the image data.

16. A method according to any of clauses 6 to 15, the method comprising transmitting the output data to a server apparatus via a data communications network.

17. A method according to clause 16, the method comprising receiving feedback data on the basis of an environment experience metric, the environment experience metric being derived by the server apparatus using the output data, the environment experience metric corresponding to a perceived experience of users in the environment.

18. A method according to clause 17, wherein the feedback data comprises an environmental control signal operable to control the environment.

19. A method according to any of clauses 6 to 18, wherein the output data is output as a real-time data stream.

20. A method according to any of clauses 6 to 19, wherein the predetermined object type comprises a predetermined part of a human body.

21. A method according to any of clauses 6 to 20, wherein the predetermined object type comprises a face and the object characteristic comprises a facial expression.

22. A method according to any of clauses 6 to 20, wherein the object characteristic comprises a gesture.

23. A computer-implemented method of processing data, the method comprising:
   receiving, via a data communications network, prediction data, the prediction data having been obtained by a remote apparatus using image data captured by a sensor, the image data corresponding to an environment of the sensor, the prediction data comprising:
      first data indicating a presence in the environment of an object of a predetermined object type; and
      second data indicating a presence in the environment of an object characteristic corresponding to the predetermined object type;
   processing the received prediction data to derive an environment experience metric corresponding to a perceived experience of users in the environment;
   generating feedback data using the environment experience metric; and
   transmitting the feedback data via the data communications network to an environmental control apparatus to enable the environmental control apparatus to control the environment on the basis of the derived environment experience metric.

24. A method according to clause 23, comprising:
receiving training data comprising images of users labelled in accordance with predetermined criteria corresponding to the environmental experience metric; and
training a regression algorithm to correlate prediction data to the environmental experience metric.

25. A computer program comprising instructions which, when executed, cause an apparatus to perform a method according to any of clauses 6 to 24.

26. A computer-readable medium comprising a computer program according to clause 25.

27. A computer-implemented method of processing data, the method comprising:
receiving image data from an image sensor, the image data corresponding to a view of an environment;
processing the image data corresponding to an image to determine data representative of the presence of objects in the image and image characteristics of the objects; and
processing the representative data to determine a valence metric for the environment.

28. A method according to clause 27, comprising:
receiving image data from a plurality of image sensors, each image data corresponding to a respective view of the environment;
processing the image data from each image sensor to determine respective representative data; and
processing the representative data from the plurality of image sensors to determine a valence metric for the environment.

29. A method according to clause 28, comprising processing the representative data from the plurality of image sensors using a neural network to determine the valence metric.

30. A method according to any of clauses 27 to 29, further comprising determining a change in environment likely to improve the valence metric, and generating control data for effecting the change in environment.

31. A method according to clause 30, further comprising changing the environment using the control data.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system for processing image data comprising an image of an environment, the system comprising:
a sensor operable to capture the image data; and
a processing circuit comprising:
a processor; and
a computer-readable storage medium comprising computer-readable instructions which, when executed by the processor, cause the processor to:
receive the image data from the sensor;
process the image data using a first path through a neural network to obtain first data, the first path being configured to indicate a presence in the environment of one or more objects of a predetermined object type;
process the image data using a second path through a neural network to obtain second data, the second path being configured to indicate a presence in the environment of one or more object characteristics corresponding to the predetermined object type; and
generate output data using the first data and the second data,
wherein the first path and the second path are arranged to enable the first data and the second data to be obtained in parallel, and
wherein generating the output data using the first data and second data comprises:
adjusting the second data using the first data; and
generating the output data using the first data and the adjusted second data.

2. A system according to claim 1, wherein the neural network is arranged to process the image data using multiple layers, and wherein the first path and the second path share initial layers.

3. A system according to claim 2, wherein each of the first path and the second path comprises a sequence of groups of layers, wherein each of the first path and the second path comprise groups of layers following the initial shared layers corresponding to respective different scales.

4. A system according to claim 3, wherein for each scale the neural network is arranged to generate in each of the first path and the second path a map of confidence data for each scale, determine a bounding box for each portion of confidence data from the first path indicative of an object, and align a corresponding bounding box for the map of confidence data generated by the second path.

5. A system according to claim 4, wherein the bounding boxes have fixed aspect ratios.

6. A system according to claim 1, further comprising a transmitter circuit operable to transmit the output data to a server apparatus via a data communications network.

7. A system according to claim 6, further comprising a receiver circuit operable to receive feedback data on the basis of an environment experience metric, the environment experience metric being derived by the server apparatus using the output data, the environment experience metric corresponding to a perceived experience of users in the environment.

8. A system according to claim 7, wherein the feedback data further comprises an environmental control signal operable to control the environment.

9. A system according to claim 1, comprising a plurality of sensors, the output of each sensor corresponding to a respective image of an environment,
wherein the image data from the plurality of sensors is processed by a respective plurality of processing circuits to generate prediction data.

10. A system according to claim 1, wherein the predetermined object type comprises a predetermined part of a human body.

11. A system according to claim 10, wherein the predetermined object type comprises a face and the object characteristic comprises a facial expression.

12. A system according to claim 10, wherein the object characteristic comprises a gesture.

13. A system according to claim 1, wherein the computer-readable instructions cause the processor to discard the image data received from the sensor following the generating of the output data.

14. A system according to claim 1, wherein the neural network comprises a convolutional neural network.

15. A system according to claim 1, further comprising a server apparatus configured to:

receive the output data;
process the output data to derive an environment experience metric corresponding to a perceived experience of users in the environment;
generate feedback data using the derived environment experience metric; and
transmit the feedback data to an environmental controller to enable the environmental controller to control the environment on the basis of the derived environment experience metric.

16. A computer-implemented method of processing image data, the method comprising:
receiving the image data;
processing the image data using a first path through a neural network to obtain first data, the first path being configured to indicate a presence in the environment of one or more objects of a predetermined object type;
processing the image data using a second path through a neural network to obtain second data, the second path being configured to indicate a presence in the environment of one or more object characteristics corresponding to the predetermined object type; and
generating output data using the first data and the second data,
wherein the first path and the second path are arranged so that the first data and the second data are obtained in parallel, and
wherein generating the output data using the first data and second data comprises:
adjusting the second data using the first data; and
generating the output data using the first data and the adjusted second data.

17. A non-transient storage medium comprising computer-readable instructions which, when executed by a computer, cause the computer to carry out a method of processing image data, the method comprising:
processing the image data using a first path through a neural network to obtain first data, the first path being configured to indicate a presence in the environment of one or more objects of a predetermined object type;
processing the image data using a second path through a neural network to obtain second data, the second path being configured to indicate a presence in the environment of one or more object characteristics corresponding to the predetermined object type; and
generating output data using the first data and the second data,
wherein the first path and the second path are arranged so that the first data and the second data are obtained in parallel, and
wherein generating the output data using the first data and second data comprises:
adjusting the second data using the first data; and
generating the output data using the first data and the adjusted second data.

* * * * *